United States Patent [19]

Rub et al.

[11] Patent Number: 4,503,420

[45] Date of Patent: Mar. 5, 1985

[54] ARRANGEMENT FOR ENCODING AND DECODING INFORMATION SIGNALS

[75] Inventors: Bernardo Rub, Marlborough; Lih J. Weng, Lexington, both of Mass.

[73] Assignee: Digital Equipment Corporation, Maynard, Mass.

[21] Appl. No.: 375,931

[22] Filed: May 7, 1982

[51] Int. Cl.³ .............................................. G11B 5/09
[52] U.S. Cl. ............................... 340/347 DD; 360/40
[58] Field of Search ............ 340/347 DD; 360/39–44

[56] References Cited

U.S. PATENT DOCUMENTS 4,020,282 4/1977 Halpern ............................ 360/40 X
4,032,979 6/1977 Rice ...................................... 360/40

OTHER PUBLICATIONS

Horiguchi et al., An Optimization of Modulation Codes in Digital Recording, IEEE Transactions on Magnetics, vol. MAG-12, No. 6, 11/1976, pp. 740-742.

Primary Examiner—T. J. Sloyan
Attorney, Agent, or Firm—Vincenzo Pitruzzella; Albert Cefalo; Ronald Reiling

[57] ABSTRACT

The present invention provides translation circuitry, which in one mode of operation acts to encode variable length data words into fixed rate data coded words for use with a communication channel, or a recording means, such as a magnetic recording medium and which in another mode of operation acts to decode the coded words to data words. The translation circuitry functions such that in an encoding operation, the second and third bits of a three-bit coded word respectively have the same binary values as the first and second bits of the data word, which the coded word represents and the second and sixth bits of a six-bit coded word respectively have the same binary values as the third and fourth bits of the data word which the coded word represents.

11 Claims, 10 Drawing Figures

2/3 TREE CODE

| DATA WORD BITS | CODED WORD BITS |
|---|---|
| 0 0 | X 0 0 |
| 0 1 | X 0 1 |
| 1 0 | 0 1 0 |
| 1 1 0 0 | X 0 0 0 0 |
| 1 1 0 1 | X 0 0 0 1 |
| 1 1 1 0 | 0 1 0 0 0 |
| 1 1 1 1 | 0 1 0 0 1 |

X = COMPLEMENT OF PRECEDING BIT

| | | | | | | | | | | | |
|---|---|---|---|---|---|---|---|---|---|---|---|
| SHIFT | 1 1 1 0 ⁵⁷⁸ | | 581 { | 0 1 0 1 ⁵⁸² | LOAD | ←79 | ←760 |
| SHIFT | 1 1 0 0 ⁵⁷⁸ | | | 1 0 1 0 ⁵⁸² | SHIFT | | |
| | | | | 0 1 0 0 ⁵⁸² | SHIFT | ←83 ←84 | ←761 ←762 |
| SHIFT | 1 0 0 1 | | | 0 0 0 0 | LOAD | ←85 | ←763 |
| SHIFT | 0 0 1 1 | | | 0 0 0 0 | SHIFT | | |
| | | | | 0 0 0 0 | SHIFT | | |
| SHIFT | 0 1 1 0 | | 586 { | 1 0 1 0 | LOAD | | |
| SHIFT | 1 1 0 0 | | | 0 1 0 0 | SHIFT | | |
| | | | | 1 0 0 0 | SHIFT | | |
| SHIFT | 1 0 1 0 | | 587 { | 0 1 0 0 | LOAD | | |
| SHIFT | 0 1 0 0 | | | 1 0 0 0 | SHIFT | | |
| | | | | 0 0 0 0 | SHIFT | | |
| SHIFT | 1 0 0 0 | | 588 { | 0 1 0 0 | LOAD | | |
| SHIFT | 0 0 0 0 | | | 1 0 0 0 | SHIFT | | |
| | | | | 0 0 0 0 | SHIFT | | |
| | | | 589 { | 1 0 0 0 | LOAD | | |
| | | | | 0 0 0 0 | SHIFT | | |
| | | | | 0 0 0 0 | SHIFT | | |

*Fig. 5a*

|100|100|101|010|000|101|010|010|100| CODED WORDS IN 2/3 CODE

|0 0|0 0|0 1|1 1 0|0 1|0 1|0|0 0| DATA WORD BITS
 592 604 605  610  619 620 621

| OPERATION | X Y Z W (513) | | A B C D (511) | OPERATION | TIME | |
|---|---|---|---|---|---|---|
| SHIFT | 1 0 0 1 | | | | ←91 | ←791 |
| SHIFT | 0 0 1 0 | | 0 0 0 0 | SHIFT | | |
| SHIFT | 0 1 0 0 | | 0 0 0 0 | LOAD | | |
| SHIFT | 1 0 0 1 | | | | | |
| SHIFT | 0 0 1 0 | 592 | 0 0 0 0 | SHIFT | ←102 ←93 | ←792 ←793 |
| SHIFT | 0 1 0 0 | | 0 0 0 0 | LOAD | ←103 | ←794 |
| SHIFT | 1 0 0 1 | | | | | |
| SHIFT | 0 0 1 0 | 604 | 0 0 0 0 | SHIFT | | |
| SHIFT | 0 1 0 1 | | 0 0 0 0 | LOAD | | |
| SHIFT | 1 0 1 0 | | 0 0 0 0 | SHIFT | ←108 ←106 | ←795 ←796 |
| SHIFT | 0 1 0 1 | 605 | | | | |
| SHIFT | 1 0 1 0 | | 0 1 0 0 | LOAD | ←109 | ←797 |
| SHIFT | 0 1 0 0 | | 1 0 0 0 | SHIFT | ←113 112 | ←798 799 |
| SHIFT | 1 0 0 0 | | | | | |

*Fig. 6*

| | | | | | | | | | | | |
|---|---|---|---|---|---|---|---|---|---|---|---|
| SHIFT | 0 0 0 0 | | 1 1 1 1 | LOAD | ←111 | ←800 |
| SHIFT | 0 0 0 1 | | | | | |
| SHIFT | 0 0 1 0 | 610 | 1 1 1 0 | SHIFT | ←117 ←116 | ←801 ←802 |
| SHIFT | 0 1 0 1 | | 1 0 0 0 | LOAD | ←115 | ←803 |
| SHIFT | 1 0 1 0 | | | | | |
| SHIFT | 0 1 0 1 | | 0 0 0 0 | SHIFT | | |
| SHIFT | 1 0 1 0 | | 0 1 0 0 | LOAD | | |
| SHIFT | 0 1 0 0 | 619 | | | | |
| SHIFT | 1 0 0 1 | | 1 0 0 0 | SHIFT | | |
| SHIFT | 0 0 1 0 | | 1 0 0 1 | LOAD | | |
| SHIFT | 0 1 0 1 | 620 | | | | |
| SHIFT | 1 0 1 0 | | 0 0 1 0 | SHIFT | | |
| SHIFT | 0 1 0 0 | 621 | 1 0 0 1 | LOAD | | |
| | | | 0 0 1 0 | SHIFT | | |

*Fig. 6a*

```
0|0 0|0 0|0 1|1 1 1 0|0 1|1 0|1 0|0 0|   DATA WORD BITS FORM A

0|0 0|0 0|0 0|1 1 1 1|0 0|1 1 0 1|0 0|0 0  DATA WORD BITS FORM B

|1 0 0|1 0 0|1 0 0|0 1 0 0 0 1|0 0 0|1 0 0 0 0 1|0 0 0|1 0 0  ENCODED FORM B
```

| OPERATION | X Y Z W | A B C D | OPERATION TIME |
|---|---|---|---|
| SHIFT | 1 0 0 1 | | |
| SHIFT | 0 0 1 0 | 0 0 0 0 | SHIFT |
| SHIFT | 0 1 0 0 | 0 0 0 0 | LOAD |
| SHIFT | 1 0 0 0 | | |
| SHIFT | 0 0 0 1 | 0 0 0 0 | SHIFT |
| SHIFT | 0 0 1 0 | 0 0 0 0 | LOAD |
| SHIFT | 0 1 0 0 | | |
| SHIFT | 1 0 0 0 | 0 0 0 0 | SHIFT |
| SHIFT | 0 0 0 1 | 1 1 1 1 | LOAD |
| SHIFT | 0 0 1 0 | | |
| SHIFT | 0 1 0 0 | 1 1 1 0 | SHIFT |
| SHIFT | 1 0 0 0 | 1 1 0 0 | LOAD |

*Fig. 7*

| | | | | | | | | |
|---|---|---|---|---|---|---|---|---|
| SHIFT | 0 | 0 | 0 | 1 | | | | |
| | | | | | 1 | 0 0 0 | SHIFT |
| SHIFT | 0 | 0 | 1 | 0 | | | | |
| SHIFT | 0 | 1 | 0 | 0 | 0 | 0 0 0 | LOAD |
| SHIFT | 1 | 0 | 0 | 0 | | | | |
| | | | | | 0 | 0 0 0 | SHIFT |
| SHIFT | 0 | 0 | 0 | 0 | | | | |
| SHIFT | 0 | 0 | 0 | 1 | 1 | 1 1 0 | LOAD |
| SHIFT | 0 | 0 | 1 | 0 | | | | |
| SHIFT | 0 | 1 | 0 | 0 | 1 | 1 0 0 | SHIFT |
| SHIFT | 1 | 0 | 0 | 0 | 0 | 1 0 0 | LOAD |
| SHIFT | 0 | 0 | 0 | 1 | | | | |
| | | | | | 1 | 0 0 0 | SHIFT |
| SHIFT | 0 | 0 | 1 | 0 | | | | |
| SHIFT | 0 | 1 | 0 | 0 | 0 | 0 0 0 | LOAD |

*Fig. 7a*

ARRANGEMENT FOR ENCODING AND DECODING INFORMATION SIGNALS

BACKGROUND

The present invention will be described in use with a magnetic recording medium, but it should be understood that it may be employed with optical recording arrangements or any serial communication channel. In data processing systems (which employ magnetic recording means to store data), the data words from the CPU, or somewhere in the data processing circuitry, are encoded into coded words before such information signals are transmitted to the recording head to be placed on the recording medium. Since a binary ONE is generally recorded as a magnetic flux transition and a binary ZERO as a non-(magnetic flux) transistion, there is normally required a certain number of ZEROS (minimum ZEROS) between the binary ONES in order to reduce the interference that would occur if the flux transitions were in adjacent positions on the magnetic recording medium. On the other hand, there is a limitation on the number of ZEROS (maximum ZEROS) that can be usefully employed because it is generally considered preferable to have a self-clocking system and if there is a large string of ZEROS between ONES, the system tends to lose, or diminish, its self-clocking capability. Very often the minimum number of ZEROS is referred to as the "d" constraint, while the maximum number of ZEROS is referred to as the "k" constraint. A coding arrangement which has a fixed d, k is referred to as a run-length-limited code. Such a code is further defined by whether or not the number of bits in a data word is fixed or is of different lengths. If the number of bits in the data words used actually vary, then the data words are referred to as variable length words. If the number of bits is fixed, the data words are referred to as fixed length words. It has been determined that there are certain advantages to employing variable length words with run-length-limited codes and it is to this combination that the present arrangement is directed.

There are many coding arrangements which attempt to compromise the constraints by providing by a high-minimum (d) number of ZEROS to reduce errors which occur by flux transition interferences and a low-maximum (k) number of ZEROS to assure good self-clocking. All such coding arrangements of variable length words are subject to error propagation. In the prior art coding arrangements for variable length words an encoded bit error (i.e. the bit on the magnetic recording medium being in error), would very likely result in many data bit errors during the decoding operation. The present code and the present circuitry for encoding and decoding that code are directed to employing an acceptable minimum ZERO factor (d=1) while employing an acceptable maximum ZERO factor (k=7). In addition, the present system employs an arrangement to simplify the encoding and decoding operations by having certain coded word bits, for each data word which is encoded, remain identical in binary values to the data word bits which they represent. In the present system, the decoding is simplified and the code arrangement as implemented by the hardware reduces error propagation.

SUMMARY

The present invention employs a ⅔ rate code. The data words are variable in length, i.e. two bits or four bits, and the code is a run-length-limited code (d=1, k=7). In the ⅔ rate code, each two bits of a data word gets encoded into three bits of a coded word. In addition, the code arrangement provides that the two bits of a two-bit data word appear as the second and third bits of a coded word, while the third and fourth bits of a four-bit data word respectively appear as the second and sixth bits of a coded word.

The circuitry employs two shift registers coupled to translation circuitry. In the encoding mode, the first shift register accepts data bit signals from the computer (or some other source) and transmits them to the translation circuitry. At the translation circuitry, the data signals are continually translated, but are not effective as coded words until they are loaded into the second shift register. The values, at the output of the translation circuitry, may change with each shift of data words into the first shift register. When the data word bit signals reach a predetermined position in the first register, the translation of certain bit signals in the first register, along with certain bit signals in the second register, is jammed, or loaded, into the second register as a coded word. The coded word bit signals, loaded in the second shift register, are continuously shifted to an output line and may be changed in response to a loading operation. In this way both the two- and four-bit words are translated or encoded into respectively three-bit and six-bit coded words.

In the decoding mode of operation, bit signals from the magnetic recording medium are shifted into the second shift register and these signals are transmitted to the translation circuitry. At the translation circuitry, the coded signals are continually translated, but are not effective as data words until they are loaded into the first shift register. The translation of the coded word bits may change with each shift of the coded words into the second shift register. When the coded word bit signals reach a predetermined position in the second register, the translation of certain coded word bit signals in the second register, along with bit signals in the first register, are jammed, or loaded, into the first shift register as a decoded data word. The data word bit signals loaded into the first register are continually shifted to an output line and may be changed in response to a loading operation. In this way, both the three-bit and six-bit coded words from the magnetic recording medium are translated, or decoded, into two-bit and four-bit data words respectively.

The features and objects of the present invention will be better understood in connection with the following description taken in conjunction with the drawings wherein:

FIG. 1 shows the relationship between data word bits and coded word bits in the ⅔ rate code;

Figure 5:
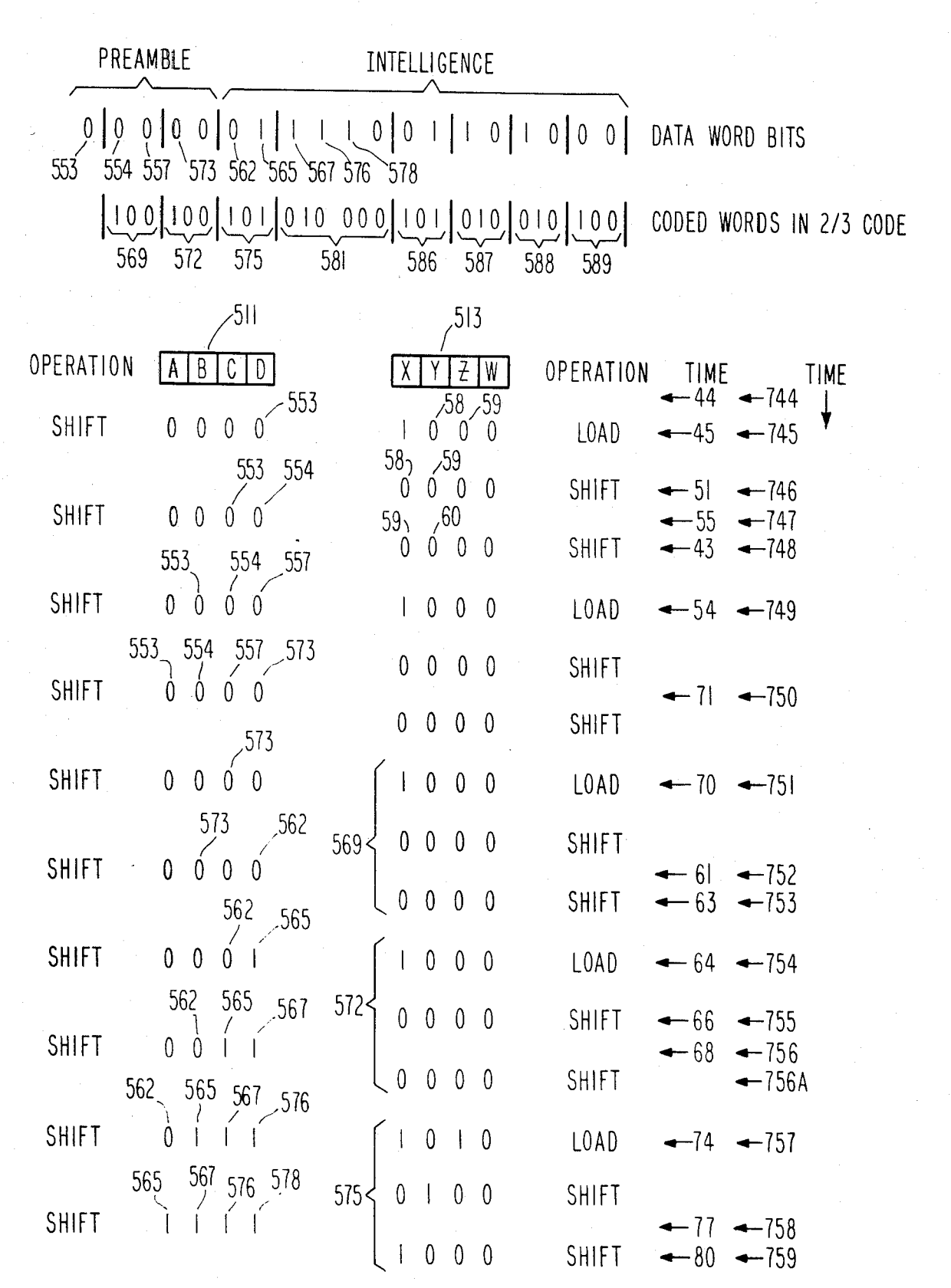

FIGS. 5 and 5a together represent a flow diagram depicting the binary values in the two shift registers during an encoding operation;

FIGS. 6 and 6a together represent a flow diagram depicting the binary values in the stages of the registers during a decoding operation of the information bits which were encoded in accordance with the flow diagram of FIG. 5; and FIGS. 7 and 7a together represent a flow diagram depicting the binary values in the stages of the registers during a decoding operation when the original data word bits are the same as those shown in FIG. 5, but with a different word boundary arrangement.

Consider FIG. 1, which shows the ⅔ rate code, which is employed in the present invention. The lefthand column entitled "Data Word Bits" shows the grouping of bits as data words. By way of example, if the computer system were using the ASCII code, the letter "Y" would be represented by 10110010. This would be a typical sequence of data words that would be employed with the present system. In FIG. 1, in the righthand column, the "Coded Word Bits" show the encoding of the data word bits by means of the ⅔ rate code. The coded word bits are transmitted to the magnetic recording medium and are stored thereon by having transitions for the ONES and nontransitions for the ZEROS. In the "Coded Word Bits" column, where the letter "x" is shown, the small "x" signifies that there may be either a ONE or a ZERO, depending upon the last bit of the previous coded word block. The small "x" would be the complement of that preceding bit. It should be noted that the first and second bits of the two-bit words in the "Data Word Bits" column are the same as the second and third bits of the three-bit coded words and this makes the decoding relatively simple. In a similar manner, it should be noted that the third and fourth bits of the four-bit data words in the lefthand column are the same as the second and sixth bits of the coded words in the "Coded Word Bits" column. In effect, during the decoding, the lefthand most bit is ignored and the system readily employs the bits which are the same in the coded word bit form as they were in the data word form.

Figure 2:
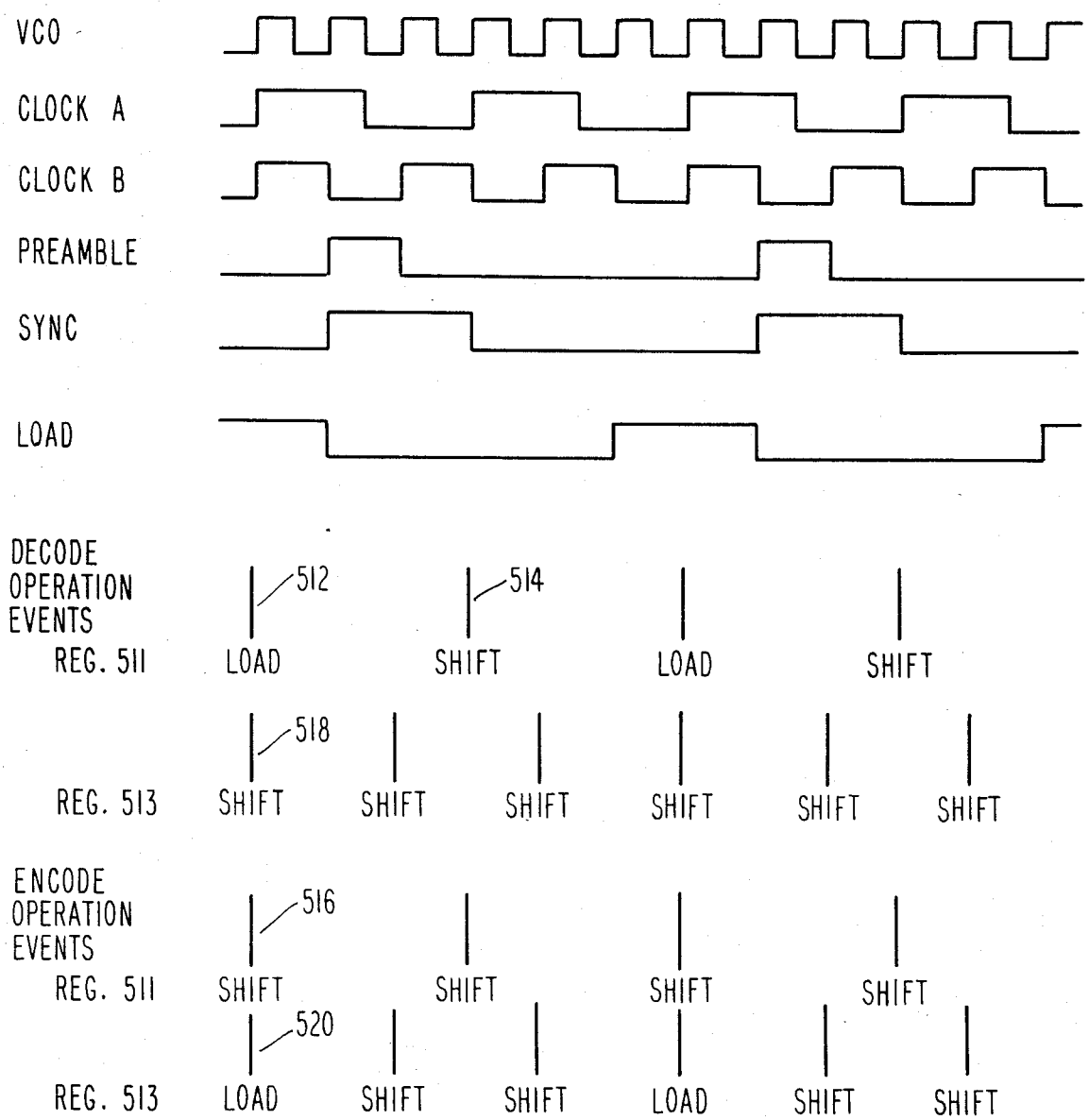
FIG. 2 depicts the waveforms of the control and the clock signals used in the system.

Consider FIG. 2, which shows the waveforms and timing relationships for the control and clock signals used with the present system. The master clock signals are generated from a phase-lock loop voltage controlled oscillator circuit and they are labelled "VCO" in FIG. 2. The VCO signal waveform is transmitted to a plurality of multiply and divide circuits to generate the clock signals shown in FIG. 2. The circuitry required to generate the waveforms or the clock signals shown in FIG. 2 can take many forms and the generation of the clock signals can be accomplished in a number of well known ways. Since the generation of the clock signals, or the circuitry that generates the clock signals, is not germane to the present invention, this description will only deal with the waveforms as they exist for proper operation.

The present system operates in an encoding mode by generating the Clock A signals from the VCO signals and transmitting the Clock A signals to the computer, or data word source, to control the clocking of data from the data source to the encoding network. In a decoding mode, the present system operates to synchronize the phase-lock loop circuit with the preamble pattern 100100100, etc., which preamble pattern is received from the recording medium. The preamble pattern is used to define word boundaries such that the clock signals will cause shifting and loading events at the proper time in the shift registers. It can be noted that the Clock A signal has a period which is equal to three periods of the VCO signals, while the Clock B signal has a period which is equal to two periods of the VCO signals. The shift registers, which are employed with the encoding and decoding circuitry, in a preferred embodiment, are designated as 10141 integrated circuit-type shift registers manufactured by the Motorola Corporation and other integrated circuit manufacturers. These shift registers have the ability to shift the signals therein and also have the ability to have signals jammed, or loaded, in parallel. Internally in the shift registers there is circuitry which accepts the load waveform shown in FIG. 2, as well as the Clock A and Clock B signals. During a decoding operation, when the load waveform is transmitted to the register 511 and is in the high-voltage state, that waveform, in conjunction with the leading edge of the Clock A signal, will cause the register 511 to be loaded. This event is signified by the load stroke 512. The shift stroke 514 occurs when the load signal is in the low-voltage state in the Clock, the leading edge of the Clock A signal goes high. During the encode operation, the load waveform is not applied to the register 511 and hence the Clock A is the control signal for events providing shift strokes as shown by the shift stroke 516. During a decode operation, the load waveform is not applied to the register 513 and hence the Clock B signal is the control signal for the events providing a shift at each of the times that the Clock B signal leading edge goes positive. These shift strokes are depicted by the shift stroke 518 and those that follow. On the other hand, during an encode operation, the register 513 does have a load waveform applied thereto and when the load waveform is in its high-voltage state and the leading edge of the Clock B signal goes high, there is a load event which takes place as indicated by the load stroke 520. In the description of the flow diagrams depicted by FIGS. 5, 6 and 7, we will consider that the strokes shown in FIG. 2 are load signals and shift signals to simplify the description.

Figure 3:
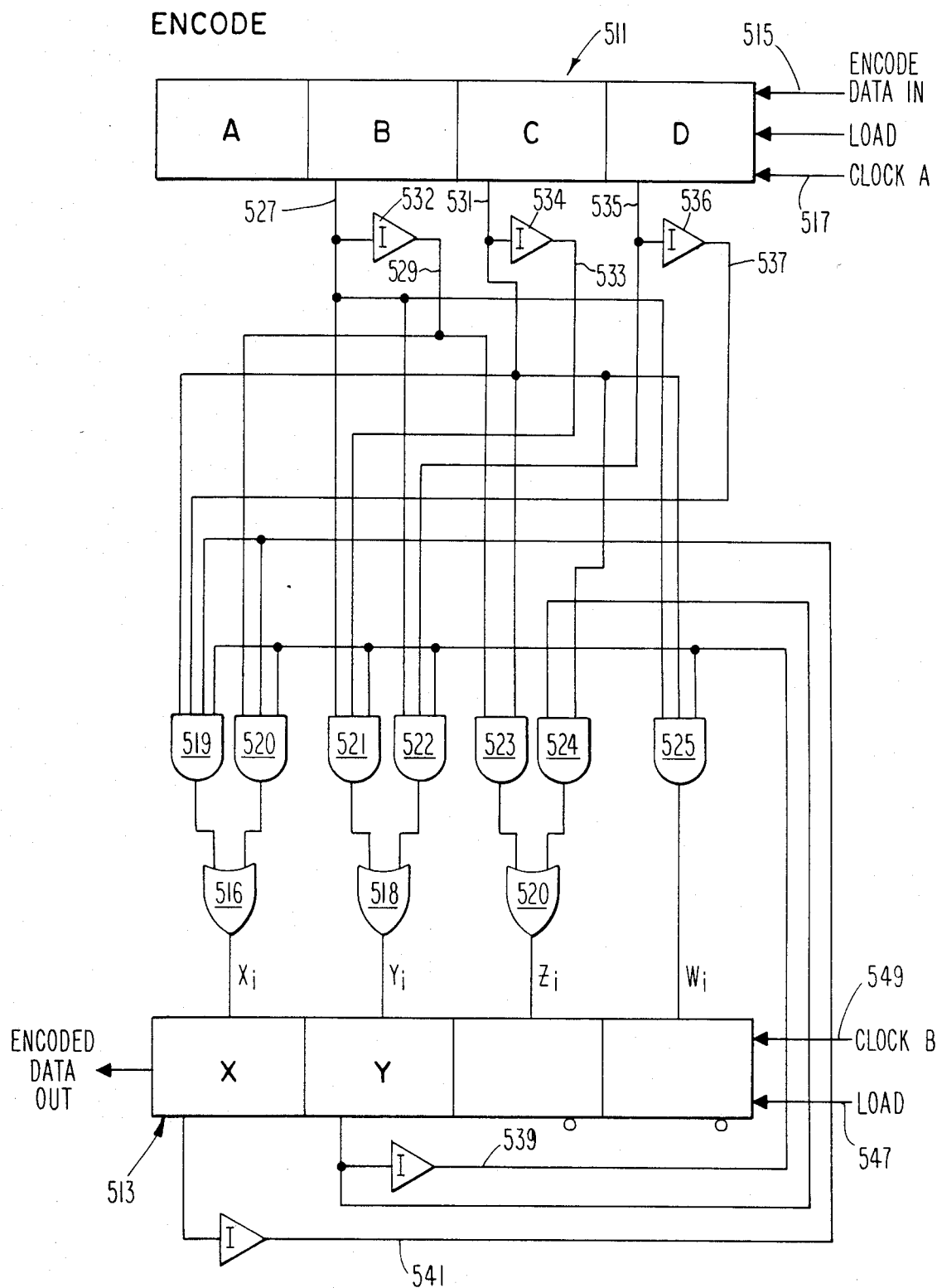
FIG. 3 is a schematic layout of logic circuitry employed to effect an encoding operation.

Consider FIGS. 3 and 5 together. In FIG. 3 we find an encoding logic circuitry arrangement. In FIG. 3 there is shown a shift register 511, which, as mentioned earlier, has the ability to shift signals therein and also has the ability to have signals jammed, or loaded, in parallel in response to a load signal. Likewise, the shift register 513, in the preferred embodiment, is a shift register which permits the shifting of signals serially to the left, in response to clock pulses applied to line 549, and at the same time the shift register 513 has a provision for permitting signals to be jammed, or loaded, into the shift register in parallel in response to a load signal. It should be noted that while the discussion describes shifting signals to the left, this description is for illustrative purposes and it should be understood that bits could be shifted to the right if proper translation circuitry is provided.

If we consider first an encoding operation, we find in FIGS. 5 and 5a (hereinafter referred to as FIG. 5) that the shift registers 511 and 513 are shown in block form and the states, or status conditions, of the various stages in those shift registers are shown in the columns underneath. Further consider that the system is going to handle a preamble pattern from the CPU of the computer, which preamble pattern is a series of ZEROS considered to be two-bit words followed by a series of data word bits representing some nonpreamble data, such as a bit sync pattern or information for a payroll, etc.

In FIG. 5, under the series of "Data Word Bits" to be considered, there are shown the coded word bits, representing those data word bits, as they would be coded in the ⅔ rate code. When a preamble pattern is transmitted from the computer, there is a series of ZEROS and these ZEROS are transmitted along the line 515, shown in FIG. 3. The clock A pulses, which are transmitted along line 517, cause the bit signals to be shifted initially into the D stage and thereafter to the C stage, then to the B stage, and finally to A stage. It should be understood that the output signals from the B, C and D stages have inverted versions respectively on the line 529, 533 and 537 by virtue of sending those output signals through the invertors 532, 534 and 536. It should also be understood that each of the AND Gates 519 through 525 is fully conditioned only when all of its input signals are ONES and that the OR Gates 526, 528 and 530 each pass a ONE signal output when any of its input signals is a ONE. If the binary values of the stages A, B, C and D of the register 511 are known and the binary values of the X and Y stages of the register 513 are known, then the output signals of the registers 511 and 513 can be followed through the logic circuitry of FIG. 3 to determine what the translation of the binary bits in those stages would be, as present on the lines $X_i$, $Y_i$, $Z_i$ and $W_i$, as well as what the encoded bits would be in the register 513.

Consider for the moment that there are ZEROS present in the stages A, B, C and D. Note that there would be a ZERO signal present on line 527 thereby providing a ZERO input to the gates 521, 522 and 525, thereby blocking those gates from passing a ONE output signal. Hence, $Y_i$ and $W_i$ would have ZERO signals present thereat. Further note that the presence of a ZERO in the C stage is transmitted along line 531 to the gates 519, 523, 524 and 525 thereby blocking those gates from passing a ONE signal output. Since neither the gates 523 nor 524 would provide a ONE output, there would result a ZERO output on the line $Z_i$. The inputs to the gate 520 must be considered to make the final determination of the signal condition on the line $X_i$. Note that the ZERO in the B stage is inverted by the invertor 532 to provide a ONE signal on line 529, which provides a ONE signal to the gate 520. One of the remaining two inputs to the gate 520 comes from an inverted output from the X stage on line 541. If we assume that we are at time 744, as shown in FIG. 5, and that the X stage is ZERO, then there would be a ONE signal on line 541 to the AND Gate 520. The last input to AND Gate 520 comes from an inverted signal from the Y stage on line 539. If we assume that there is a ZERO in the Y stage, then there will be a ONE on line 539 transmitted to the gate 520 to fully condition the AND Gate 520. The AND Gate 520 will provide a ONE output therefrom through the OR Gate 526 to the $X_i$ line. Hence, the condition of the lines $X_i$, $Y_i$, $Z_i$ and $W_i$ is 1000 and at time 745, when a load signal is generated, the binary values set forth above will be loaded in parallel into the register 513. This condition is shown at time 745 in FIG. 5.

If we follow the flow diagram in FIG. 5, we find that, at time 745, the system is being exposed to a preamble pattern from the computer (which is a plurality of ZEROS), whose main purpose is to create the preamble pattern 100100100, etc. on the recording medium. This preamble pattern from the recording medium will later be used to define word boundaries as mentioned earlier. At some given time, ZEROS from the preamble pattern have been loaded into the register 511 and we are considering the time when the ZERO 553, shown in the "Data Word Bits" line, is the ZERO 553 loaded into the D stage of the register 511. At the same time, 1000 has been loaded into the register 513 from the translation circuit, which has decoded a previous set of ZEROS in the register 511. In response to a Clock B signal, the information in the register 513 is shifted and, as can be seen at time 746, all ZEROS are provided in the register 513. Subsequently, in response to a Clock A signal, the information in the register 511 is shifted so that the ZERO 553 is now in the C stage position and the ZERO 554 is in the D stage position. Thereafter, in response to a Clock B signal, the information in register 513 is shifted and there results the pattern shown at time 748. Thereafter, at time 749, in response to a Clock B signal and the load waveform being high, a load signal is generated in the register 513. In response to the "load" signal, the ZEROS in register 511, shown at time 747, which have been translated are loaded into the register 513. This condition is depicted in FIG. 5 by the register 513 at time 749. Simultaneously, the register 511 experiences another shifting of the information so that the ZERO 553 is now in the B stage, while the ZERO 554 is in the C stage and the ZERO 557 is in the D stage. It should be noted that when a bit signal is in the X stage, it is available for transmission to the magnetic recording medium and, therefore, by the time 748 the register 513 has transmitted a 100 to the magnetic recording medium, which is the preamble pattern described earlier.

At time 749, the data bits in the register 511 (as depicted at time 747) as well as the bits in the X and Y stages of the register 513 (as depicted at time 748) will be translated to provide the binary values shown in the register 513. The operation of the system repeats itself and by the time 751 is reached, a second set of bits 100 has been transmitted to the magnetic recording medium. The system repeats the foregoing operation twice more, as depicted in FIG. 5, so that by the time 757 a third and fourth set of bits 100 have been transmitted to the magnetic recording medium. It can be noted in FIG. 5 that a coded word 100, identified as 569, is identified under stage X as it serially leaves the register 513. Likewise, the coded word 100, identified as 572, is also depicted under the X stage.

The point of departure from the preamble pattern being shifted into the register 511 appears at time 752. It can be determined from FIG. 5 that the ZERO, identified as 562 in the "Data Word Bits" is loaded into the D stage at time 752. At time 754, the ONE bit, identified as 565 in the "Data Word Bit" row, is loaded into the D stage of the register 511. The ZERO 562 has been shifted to the C stage at that time. At time 756, we find that the ONE bit 567 from the "Data Word Bits" row is shifted to the D stage, while the ONE bit 565 is shifted into the C stage and the ZERO bit is shifted into the B stage. At time 757, the bits from the register 511, which were present therein in time 756, along with the X and Y bits present in the register 513 just prior to time 757, are translated and loaded into the register 513. If we consider the circuitry of FIG. 3 we can follow the translation of the bits in the registers 511 and 513 just prior to 757 time. Just prior to 757 time there will be a ZERO bit in the B stage of the register 511, which will provide a ZERO signal to the gates 521, 522 and 525, thus providing a ZERO signal on the lines $Y_i$ and $W_i$. There will be a ONE bit in the C stage which will provide a ONE signal to the gates 519, 523, 524 and 525. The other input to the AND Gate 523 comes from the inverted output of the B stage, which will accordingly be a ONE and, therefore the gate 523 is fully conditioned to provide a ONE output signal through the OR gate 530 to the line $Z_i$. The inverted output from the B stage on line 529 provides a ONE input signal to the gate 520. One of the two remaining input signals to the gate 520 comes from the inverted output of the X stage and if we look at the X stage in FIG. 5 at time 756A, we find that the X has a ZERO therein. Accordingly, there will be a ONE signal on line 541 to provide a second ONE signal to the gate 520. The last input line to the gate 520 comes from the inverted output of the stage Y. If we look at the condition of the stage Y at time 756A, in FIG. 5, we find that the Y is ZERO and, therefore, there is a ONE signal on line 539 to provide the third ONE input signal to the gate 520. Accordingly, the gate 520 provides a ONE output through the OR Gate 526 to the $X_i$ line. Hence, the condition of the lines $X_i$, $Y_i$, $Z_i$ and $W_i$ is 1010 and this is the coded word which is loaded into the register 513 at the time 757. Note as the register 513 is shifted up to the time 759, the encoded word 101, identified as 575, is transmitted to the magnetic recording medium.

It should be noted that at time 756, the ONE bit 567 is loaded into the D stage of the register 511. The ONE bit 567 is the first bit of a four-bit data word, which is to be coded into six bits. At time 758, the ONE bit 567 is in the B stage and the ONE bit 576 is in the C stage, while the ONE bit 578 is in the D stage. It is that condition of the register 511, along with the conditions of the X and Y bits at the 759 time, that is translated to provide the loading bits for the 513 register at time 760. If we follow the circuitry in FIG. 3, as we have done heretofore, we find that the register 513 will be loaded with as 0101, as shown at time 760. The ONE bit 582 is loaded into the W stage because the Y stage at time 759 had a ZERO therein, indicating that the previous information read was not the first half of a double word. As the bits in the register 513 are shifted down to the time 762, the ONE bit 582 moves to the Y stage. Hence, when the bits in the register 511 (as seen at time 761), and the X and Y bits in the register 513 (as seen at time 762), are translated to load the register 513 at time 763, the ONE bit 582 plays a control role. The ONE bit 582 is in the stage Y and, therefore, provides a ZERO signal on line 539 to block the gates 519, 520, 521, 522 and 525 from providing ONE bit signals to the register 513 during load time. The ONE bit 582 provides a control signal to the translation circuitry, which indicates that the translation circuitry is now considering the second half of a double word. If we look at the coding arrangement in FIG. 1, we find that the fourth and fifth bits, which would reside in the stages X and Y, must be ZEROS and hence the ONE bit in the stage Y at 762 time assures that ZEROS will be placed in the X and Y stages at the load time. If we examine the code arrangement further from FIG. 1, we find that the sixth bit is identical to the fourth bit of the "Data Word Bits", and at time 761, the fourth bit is in the C stage of the register 511. Since the C stage has a ZERO therein, from FIG. 5, we find that a ZERO would provide a ZERO signal on line 531 in FIG. 3 to block both of the AND Gates 523 and 524 to ensure that the line $Z_i$ had a ZERO thereat. On the other hand, if there had been a ONE present in the C position, representing the fourth bit of a four-bit data word, then that ONE in the C stage (consider the circuitry of FIG. 3) would provide a ONE on line 531 to partially condition the AND Gate 524. The ONE signal from the Y stage provides the second ONE input for the gate 524 to provide a ONE in the Z stage of the register 513. It can be seen that by this technique the fourth bit of a four-bit data word is correctly transferred into the sixth position of a coded word.

The procedure of encoding the remainder of the nonpreamble data bits can be followed in accordance with the previous description and it will be seen that the nonpreamble coded words, identified as 586, appear as 586 under stage X in FIG. 5, and similarly the non-preamble bits identified as 587, 588 and 589 in the "Coded Words" row appear as 587, 588 and 589 under the stage X in FIG. 5. It should be remembered that stage X is the last stage and when the information is shifted thereinto, it is available for immediate transmission to the magnetic recording medium, as is intended.

In the decoding operation, some of the bit signals in each of the registers are control signals to cause the present system to decode a coded word, either as a three-bit coded word or as a six-bit coded word. In particular, the logic circuitry is "looking" for a three ZERO recognition, that is, three ZEROS respectively in the first three stages, i.e. in the W, Z and Y stages, of register 513. It is apparent from the six-bit coded words in FIG. 1 that three ZEROS occur as the third, fourth and fifth bits in each six-bit coded word. The present circuitry operates such that just prior to a load time, if the register 513 has three ZEROS in the first three stages and a ZERO in the B stage of the 511 register, then the three ZEROS are recognized as the third, fourth and fifth bits of a six-bit word. Having thus recognized the coded word as a six-bit coded word, the circuitry of the present system is designed to store the bit signal in the X stage of register 513 because that bit signal is the second bit of the six-bit word being decoded. When a six-bit word is decoded, as can be seen in FIG. 1, the second bit of a six-bit coded word becomes the third bit of a decoded four-bit data word. During the three ZERO recognition, the bit signal in the X stage of register 513 is stored by transferring it at load time to the D stage of the register 511. Simultaneously, in response to the three ZERO recognition, the circuitry jams two ONES (11) respectively into the A and B stages of register 511 to provide the first two ONES shown in the four-bit data words in FIG. 1. In addition, the circuitry of the present system is designed so that if another three ZEROS should occur at the next translation time, the system does not attempt to translate a second half of a six-bit word twice in succession. To say that another way, the system treats the first three bits within a word boundary as a three-bit coded word. If there is a three ZERO recognition, the next three bits, within a word boundary, are treated as the second half of a six-bit coded word. If there were a second three ZERO recognition, the system does not want to go through another successive decoding of a second half of a six-bit coded word. The way that the system prevents a second successive decoding of a second half is to jam a ONE into the C stage so that at translation time that ONE will be in the B stage and it will "tell" the system that the three bits last translated were the second half of a double word and, accordingly, the next three bits to be translated must be the first three bits of a coded word, even though a three ZERO recognition may be in effect.

The bit signal in the D stage is moved to the C stage at the first shift after which time both of the jammed ONES have been sent to the computer. At the following load time, the bit signal in the C stage (which is the second bit of the six-bit coded word) is placed in the A stage (to become the third bit in a four-bit data word)

and the bit in the Y stage (which was the sixth bit in the six-bit coded word) is placed in the B stage. This operation assures that the second and sixth bits of a six-bit coded word end up residing in the third and fourth bits of a four-bit data word.

Figure 4:
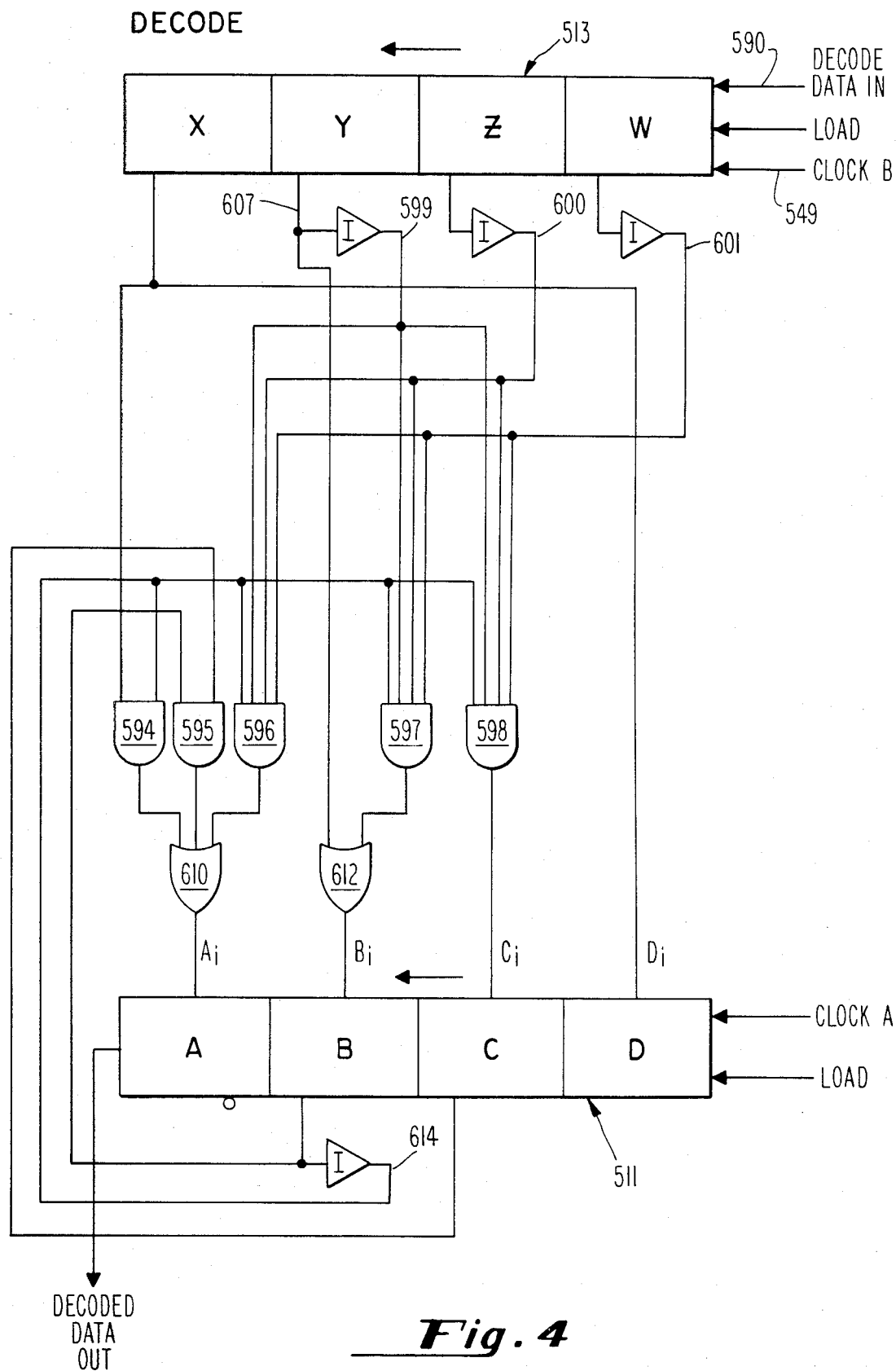
FIG. 4 is a schematic layout of logic circuitry to effect a decoding operation.

The foregoing operation and the decoding circuitry can be better understood by considering FIGS. 4 as well as 6 and 6a (hereinafter referred to as FIG. 6). In FIG. 4, there are shown shift registers 511 and 513, which are the same shift registers as discussed with respect to FIG. 3. In FIG. 4, there is shown a "Decode Data In" line 590 upon which the information from the magnetic recording medium is transmitted to the shift register 513. The information is shifted into the shift register in response to the B Clock signals, as described earlier. In FIG. 6, there is shown the same message that was encoded in accordance with the discussion related to FIGS. 3 and 5 and there is further shown the "Data Word Bits" into which the encoded message should be translated, or decoded, in response to going through the decoding operation. The registers 511 and 513 are also shown in FIG. 6. In the flow diagram of FIG. 6, the information is being loaded into the shift register 511 as compared to being loaded in the shift register 513 during the encoding operation.

When the information is taken from the magnetic recording medium, there is a preamble pattern 100100100, etc., as mentioned earlier. The 100 pattern is shown at time 791 in the shift register 513. If we advance further down the flow diagram we find the preamble pattern decoded and identified as 592 and 604. If we want to consider decoding the information in register 513 into the "Data Word Bits" identified as 605, then we must examine what is in the shift register 513 at time 796. At time 796, the bits 0101 are in the register 513. If we consider the circuitry of FIG. 4, we find that the ZERO in the X stage provides a ZERO signal to the gate 594 and directly to the D stage of the register 511. With a ONE in the stage Y of the shift register 513, there is a ZERO signal on the inverted line 599 to the gates 596, 597 and 598. It should be also noted that because of the ONE in the Y stage, there is a ONE signal on line 607 to provide a ONE signal through the OR Gate 612 to the $B_i$ line. Finally, we must consider the inputs to the AND Gate 595. The inputs to the AND Gate 595 come from the noninverted output line of the B stage of the register 511 and, if we examine that register as shown in FIG. 6 at time 795, we find that there is a ZERO therein. Accordingly, there is a ZERO signal applied to the gate 595 thus blocking that gate from passing a ONE signal to the $A_i$ line. Hence, the lines $A_i$, $B_i$, $C_i$ and $D_i$ are providing the signals 0100 to the register 511 as can be seen in FIG. 6 at time 797. When the register 511 is shifted at time 798, there will have been a 01 "Data Word Bits" transmitted to the computer system.

Consider next the decoding of the information to provide the "Data Word Bits" 1110, identified as 610. We find that load time 800 in FIG. 6, the system has had to take into account the coded word bits present in the shift register 513 at time 799. If we consider the circuitry of FIG. 4, we can glean how the circuitry operates to translate the information present at time 799 into the values which are present at the load time 800. In the shift register 513 at time 799, there is a 1000 present. Because of the ZERO in the Y stage, there would be a ZERO signal at the $B_i$ input unless the gate 597 is fully conditioned. Because of the ONE in the X stage, there is a ONE signal provided to the gate 594 and a ONE signal present on the $D_i$ line. Because of the ZERO present in the Y stage, there is a ONE signal present on the inverted line 599, which provides a ONE input signal to the gates 596, 597 and 598. Because of the ZERO present in the Z stage, there is a ONE signal on the inverted line 600 to provide a ONE signal to the AND Gates 596, 597 and 598. Because of the ZERO present in the W stage, there is a ONE signal on the inverted line 601 to provide a ONE input signal to the gates 596, 597 and 598. The remaining input signals to the gates 596, 597 and 598 come from the B stage of the register 511. Accordingly, we must look at the condition of the B stage of register 511 at time 798. It is apparent from FIG. 6, that at time 798 the B stage of the shift register 511 is ZERO and, hence, the output signal on the inverted line 614 in FIG. 4 is a ONE signal which is provided as the fourth ONE input signal to each of the gates 596, 597 and 598. Hence the gates 596, 597 and 598 are fully conditioned to provide ONE signals on the lines $A_i$, $B_i$ and $C_i$. We have already discussed the presence of a ONE signal on the $B_i$ line and, hence, the register 511 is loaded with the value 1111 as depicted at time 800 in FIG. 6.

If the procedure set forth above is followed, it becomes apparent that the coded words are properly translated by the circuitry of FIG. 4 to provide the "Data Word Bit" groupings identified as 610, 619, 620 and 621.

In FIGS. 7 and 7a (hereinafter referred to as FIG. 7) there is depicted a flow diagram with the binary values in the registers 511 and 513 during a decoding operation. The decoding operation, depicted by the flow diagram of FIG. 7, is for the decoding of "Data Word Bits" which have the same serial arrangement as the "Data Word Bits" shown in FIG. 6, but which have been grouped differently as words when the "Data Word Bits" were encoded. To say that another way, we find in FIG. 7 "Data Word Bits Form A", which are identical to the "Data Word Bits" formation shown in FIG. 6. Also shown in FIG. 7 is a series of "Data Word Bits" called "Data Word Bits Form B". The "Data Word Bits Form B" are word grouped differently, in two-bit and four-bit words, than are the "Data Word Bits Form A". The "Data Word Bits Form B" have been encoded according to the coding arrangement of FIG. 1 to provide the coded words labelled "Encoded Form B", as seen in FIG. 7. It is the decoding of the coded words, identified as "Encoded Form B", which is set out in the flow diagram of FIG. 7. The circuitry of FIG. 4 can be used to decode the coded words in the register 513 and load them into the register 511, as was done in the description heretofore. It will be noted that when the coded words, as set out in the "Encoded Form B" and as shifted through the shift register 513 are decoded and transmitted from the register 513, they provide a series of data bits as found in column form under the stage A, which serial form is identical to the serial form of the "Data Word Bits Form A". To say that another way, each of the bits in stage A is transmitted to the computer device, as was described above. Accordingly, if the bits under stage A are examined, it becomes apparent that those bits are in the same serial form as are the bits in "Data Word Bits Form A" and "Data Word Bits Form B", as well as the "Data Word Bits" of FIG. 6. In the present system there are two possible ways of defining the word "boundaries" and the decoding circuitry of the present system will decode the coded words to provide the same sequence of bits irrespective of how the word boundaries were defined during the encoding operation. The computer will handle the bit sequence to put the bits in useful groups for the computer's own purpose. It should also be understood that the circuitry of the present system does not per se recognize the difference between preamble data and nonpreamble data (such as bit synchronization patterns, payroll data, and the like). The data from the computer is encoded whether it be preamble data or nonpreamble data and the coded words are decoded whether they be preamble data or nonpreamble data. While the translation circuitry has been shown in FIGS. 3 and 4 to be AND Gate logic, a ROM device could be used whereby the input signals would merely activate a look-up table arrangement to provide the proper output signals.

The simplicity of the decoding is made possible because the encoding circuitry encodes the data words such that the second and third bits of the coded words, for a three-bit coded word, are the same as the first and second bits of the two-bit data word, while the second and sixth bits, of a six-bit coded word, are the same as the third and fourth bits of a four-bit data word. Because there is a direct relationship between the arrangement of the bits in the data word form with certain bits in the coded word form, as just described above, it follows that a single encoding error, in most cases, results in a single decoding error and there is a significant reduction in error propagation, as is found in prior art encoding implementation.

We claim:

1. A circuitry arrangement for effecting an encoding operation by translating data word signals into coded word signals for use with a memory medium, communication channel and the like, comprising in combination: input means to receive data word signals; translating circuitry means coupled to said input means and formed to translate data word signals representing first and second bits into coded word signals representing first, second and third bits in such a manner that the first and second bits of said data word are respectively identical to the second and third bits of said coded word and further formed to translate data word signals representing first, second, third and fourth bits into coded word signals representing first, second, third, fourth, fifth and sixth bits in such a manner that the third and fourth bits of said data word are respectively identical to the second and sixth bits of said coded words; and output means coupled to said translating means to receive coded word signals therefrom to be transmitted to said memory medium, or the like.

2. A circuit arrangement according claim 1 wherein said output means is formed and coupled to provide input signals to said translating means to affect a translation of said data word signals.

3. A circuitry arrangement according to claim 1 wherein said input means is a shift register having at least three stages and wherein said translating circuitry means is formed such that the word boundary of data words entering said input means shift register is defined by the signals in the third and second stages as viewed from the signal input side.

4. A circuitry arrangement according to claim 3 wherein the output means is a four-stage shift register and the translation circuitry is formed to place a first bit signal in the first stage of said output means shift register when the third and second stages of said input means shift register are holding bit signals which indicate that a four-bit word is being encoded.

5. A circuitry arrangement according to claim 4 wherein said translation circuitry means is formed such that when there is a first bit signal in the third stage of said output means shift register, said translation circuitry means will effect a translation of a four-bit data word into a six-bit coded word.

6. A circuitry arrangement according to claim 1 wherein said input means is a shift register which is formed to effect a serial shift of bit signals therethrough and formed to receive bit signals in parallel from said translation circuitry means in a loading operation and wherein said output means is a shift register which is formed to effect a serial shift of bit signals therethrough and formed to receive bit signals in parallel from said translation circuitry means in a loading operation and wherein said translation circuitry means is formed to effect in conjunction with said input and output means both an encoding operation and decoding operation.

7. A circuitry arrangement for effecting a decoding operation by translating coded word signals into data word signals for use with a data processing device, comprising in combustion: input means to receive coded word signals; translating circuitry means coupled to said input means and formed to translate coded word signals representing first, second and third bits into data word signals representing first and second bits in such a manner that the second and third bits of said coded words are respectively identical to the first and second bits of said data word and further formed to translate coded word signals representing first, second, third, fourth, fifth and sixth bits into data word signals representing first, second, third and fourth bits in such a manner that the second and sixth bits of said coded words are respectively identical to the third and fourth bits of said data words; and output means coupled to said translating circuitry means to receive data word signals therefrom to be transmitted to said data processing device.

8. A circuitry arrangement according to claim 7 wherein said output means is formed and coupled to provide input signals to said translating circuitry means to affect a translation of said coded word signals.

9. A circuitry arrangement according to claim 7 wherein said input means is a four-stage shift register and wherein said translating circuitry means is formed such that the word boundary of coded data word entering said input means shift register is defined by signals in the third, second and first stages of said input means shift register.

10. A circuitry arrangement according to claim 9 wherein said output means is a shift register having at least three stages and wherein said translating circuitry means is formed to transfer the bit signal residing in the fourth stage of said input means shift register into the first stage of said output means shift register when said first, second and third stages of said input means shift register each contains a second bit signal.

11. A circuitry arrangement according to claim 10 wherein said translating circuitry means is formed such that when there is a first bit located in the third stage of said output means shift register, said translating circuitry means will recognize that the coded word being translated is a six-bit coded word.

* * * * *